Oct. 9, 1934.   U. A. ABRAHAMS   1,976,472
METALLIC WEATHER STRIP FOR WINDOWS
Original Filed Dec. 19, 1931
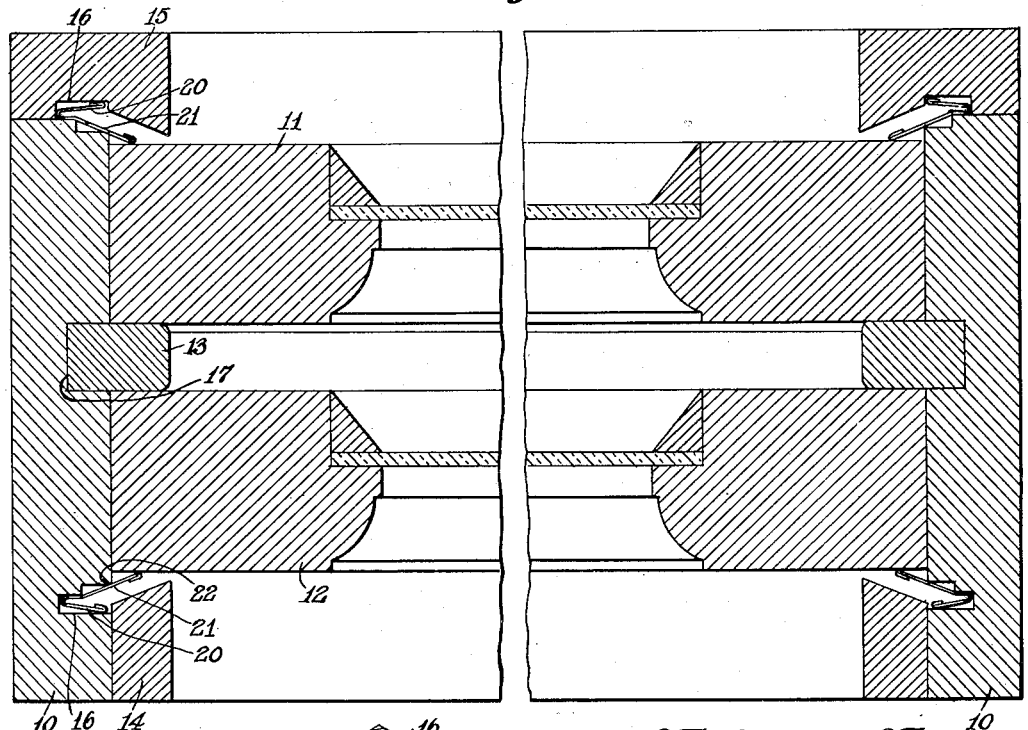
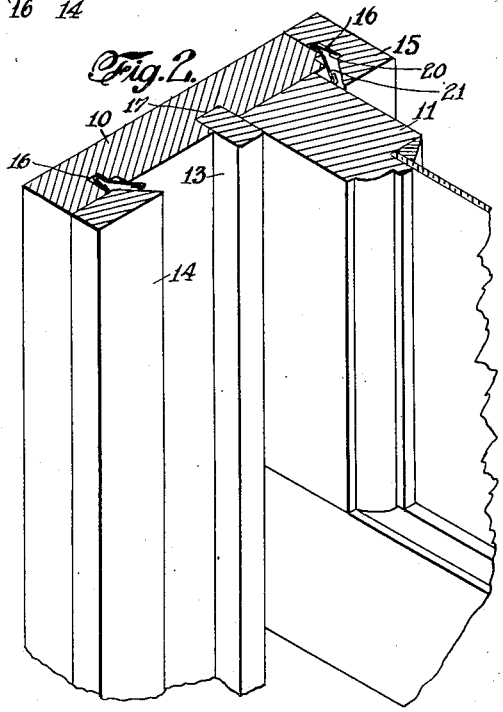
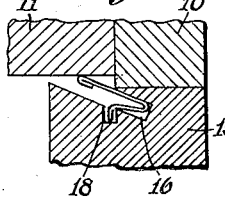
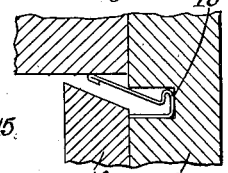
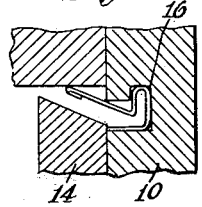
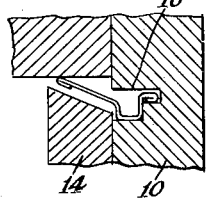
INVENTOR
ULRICH A. ABRAHAMS
BY
ATTORNEY Patented Oct. 9, 1934

1,976,472

UNITED STATES PATENT OFFICE 1,976,472

METALLIC WEATHER STRIP FOR WINDOWS

Ulrich A. Abrahams, Newark, N. J.

Application December 19, 1931, Serial No. 582,072
Renewed March 3, 1934

9 Claims. (Cl. 20—69)

The invention relates to the installation of weather strips in windows and the like, and more particularly of weather strips consisting of resilient non-corrodible metal such as sheet brass, bronze, etc.

The invention has for a general object the provision of a weather strip installation wherein the metal strip may be applied without the use of nails or like fastening devices designed usually to directly hold a strip in place; and also in the provision of a groove in the window frame for seating the strip.

A further object of the invention resides in the provision of an inexpensive weather strip element which may be conveniently arranged for in the original construction of the window members so that it is necessary merely to snap a length of weather strip into place, for example, when the window-sash is being positioned in its frame, said strip element, however, being also applicable to windows already installed.

Another object of the invention contemplates the provision of a strip mounting which, when the strip has been installed, is such that said strip will not interfere with or hinder any subsequent required repairs to a window; also, wherein adjustment of the strip may be effected after installation.

Still another object of the invention resides in the provision of a weather strip installation wherein the strip element is tensioned in its action and will maintain the sash closely against the window parting strip or bead and thus will insure close proximity of the window meeting rails, as well as accommodating itself to obviate sticking of a sash upon swelling of the latter and rattling thereof with shrinking of said sash.

In carrying out the invention, each side of the window frame is provided with a longitudinal recess, or pair of recesses, so located as to be substantially beneath the inner side of the front stop and rear frame-stop portion of the window and which stops are designed to overhang the respective recesses. In some installations it may be necessary to also provide the under face of the back stop member with a juxtaposed longitudinal recess, as when applying the weather strip to a window already in place.

Into a said recess, there is then positioned the weather strip element which may be in the form of a length of sheet metal folded longitudinally upon itself to provide leaves or side portions, for example, of different widths and at an angle approximately 45° or less. Furthermore, the side of greater width is arranged to have its free edge portion project beyond the recess and is directed toward the sash as a whole in the direction of the window parting strip, the other side being suitably seated in said recess, for example, with its free edge anchored against outward movement by the corresponding forward or rearward stop overhanging sufficiently the said recess to restrain outward movement of this edge.

By this expedient, not only will a sash work smoothly, but the same is always closely pressed against the parting strips to be sealed against the elements. Furthermore, no nails or other securing means for directly holding a strip in position are required, and the same snaps readily into place necessitating no particular skill in its installation. The position of the recess in the frame is such, moreover, that there will be no interference with sash ropes nor with access to the sash weights when necessary.

In addition, the said recess is so designed that movement of the strip toward the sash is limited but may be varied to the desired extent, for example, by paring off an inner corner of the wall of the recess; or, the extent of overhang of the stop member which cooperates with the one side of the angular strip may be regulated to accommodate a swelled sash, it being understood that the inner face of a stop is modified from the usual perpendicular surface to a beveled one.

The nature of the invention, however, will best be understood when described in connection with the accompanying drawing, in which:

Fig. 1 is a horizontal section through a double-hung window and frame with the novel weather strip installation.

Fig. 2 is a fragmentary perspective view illustrating a portion of the rear sash in position in its frame and held toward the window parting strip by means of a weather strip.

Fig. 3 is a fragmentary sectional view illustrating the application of a strip to a window already in place.

Figs. 4 to 6 are fragmentary horizontal sections illustrating modified forms of the strip and different arrangements for locating the same in the frame.

Referring to the drawing, 10 designates the sides of a window frame enclosing the upper sash 11 and lower sash 12 of a window, said frame being provided with the usual parting strip 13 and inner and outer stops 14 and 15, respectively. In the case of the latter stop member this is usually constituted as an integral or permanently secured portion of the frame, and only its outer portion which projects above the frame surface will herein be considered as the stop, the remainder being considered as frame, although not necessarily an integral portion thereof.

The construction of the window is in accordance with the usual practice, but the frame has been modified in that longitudinal grooves or channels 16 are ploughed or sawed therein, preferably at the time of cutting in the groove 17 for the parting strip 13, and substantially parallel to the stiles of the sashes. However, where the grooves 16 are not provided at the time of manufacture of the window frame, they may be sawed or ploughed therein after installation and upon removal of the front or inner stop 14 and sashes and parting strip 13. The outer or rear stop is usually not removable, and in sawing the groove in the frame with the rear stop in place it will be necessary also to saw into the said rear stop and at an angle, as is more clearly shown in Fig. 3 of the drawing, as well as undercutting the stop member as in the provision of the longitudinal groove 18. The said grooves 16 are located equidistantly upon opposite sides of the parting strip 13 in conformity with the sash widths and at a distance therefrom slightly in excess of the thickness of a corresponding sash.

As indicated, the grooves or recesses 16 are designed to seat a weather strip member which comprises a sheet metal resilient element, more or less V-shaped, as by being bent or folded longitudinally upon itself to provide the sides 20 and 21 preferably of different widths, the latter being the longer and the two sides forming an angle preferably less than 45°. The longer side 21 is designed to bear with its free edge projecting beyond the frame against the stile of a sash, while the side of lesser width may have its free edge in engagement with the inner portion of a stop which overhangs the groove sufficiently to anchor the weather strip in its recess and to afford an abutment for the action of the wider side against the stile. The inner face of this stop is also beveled, for the purpose hereinafter set forth, rather than perpendicular with respect to the frame face as is the usual practice.

The weather strip fits more or less loosely within its recess and the movement of the wider side in a direction toward the sash is limited through engagement with the upper corner or inner edge 22 of the groove. No nails, screws or other direct securing means are necessary to retain a weather strip within its said recess; and if it be found necessary to adjust the action of a strip upon a sash in urging it toward its parting strip, for example, because of excessive shrinkage of the sash, this edge 22 may be beveled to permit the strip portion 21 to move further toward the parting strip. Or, in case of excessive swelling of a sash, the upper edge of the corresponding beveled stop may be pared off similarly. It will be understood, also, that even if no sash be interposed, the strip portion 21 can only move a definite distance as determined by contact with the corner 22. By stepping the recesses, for example, along the inner wall of a recess and as is shown in Figs. 1 and 2 of the drawing, and seating the apex of the angularly folded strip element in the bottom and more contracted recessed portion, play of a strip in its recess is not only restricted but an abutment is provided for tensioning the side 21 when forced toward its stop member by contact with the stile of a sash.

With both upper and lower sashes thus equipped with strips in the manner hereinbefore described, both of these sashes will be urged toward the parting strip and thus insure of close contact along their meeting rails.

Various modifications in the structure of the strip itself and recesses are possible, several different forms being indicated in Figs. 4, 5 and 6 showing various forms of recesses and different formations of the strip itself, the essential feature being that the strip is located and anchored over its one portion in the recess through the stop member associated with the frame while another and projecting portion of the strip resiliently contacts with the stile of a sash to urge the same in a direction toward the parting strip of the window.

I claim:

1. The combination with a window of the double-hung type and embodying a frame, sashes and stop members, the frame having a recess provided longitudinally therein behind the inner edge of the stop; of a resilient weather strip element seated in the recess and having one portion engaging a stop member to hold the strip in the recess and the other portion projecting beyond said recess for contacting with the outer face of the stile of the sash.

2. The combination with a window of the double-hung type and embodying a frame, sashes and stop members, the frame having a recess provided longitudinally therein behind the inner edge of the stop; of a resilient weather strip element seated in the recess and having portions of unequal length, the one engaging a stop member to hold the strip in the recess and the other projecting beyond said recess for contacting with the outer face of the stile of the sash.

3. The combination with a window of the double-hung type and embodying a frame, sashes and stop members, the latter being beveled over their respective inner faces, and the frame having a recess provided longitudinally therein behind the inner edge of the stop; of a resilient weather strip element seated in the recess beneath the corresponding beveled surface portion of a stop member and having one portion engaging a stop member to hold the strip in the recess and the other portion projecting beyond said recess for contacting with the outer face of the stile of the sash.

4. The combination with a window of the double-hung type and embodying a frame, sashes and stop members, the frame having a recess provided longitudinally therein behind the inner edge of the stop; of a resilient angular weather strip element seated in the recess and having sides of unequal width, the narrower engaging the corresponding stop member to be held thereby in the recess and the wider projecting beyond the recess for contacting with the stile of the sash.

5. The combination with a window of the double-hung type and embodying a frame, sashes and stop members, the frame having a recess provided longitudinally therein behind the inner edge of the stop; of a folded sheet metal resilient and angular weather strip element seated in the recess, the angle between the sides being less than 45° and said sides being of an unequal width with the narrower contacting along its edge with a corresponding stop member and the wider projecting beyond the recess for contacting with the stile of the sash.

6. The combination with a window of the double-hung type and embodying a frame, sashes, parting strip and stop members, the frame having recesses provided longitudinally therein behind the inner edge of the stop and parallel to the sash stile upon opposite sides of the parting strip and at distances therefrom somewhat in excess of the thickness of the corresponding sash; of resilient weather strip elements seated in the respective recesses and having one portion engaging a stop of the window to hold the strip within its recess and the other portion projecting beyond said recess for contacting with the stile of the sash to urge the latter toward the window parting strip.

7. The combination with a window of the double-hung type and embodying a frame, sashes and stop members, the frame having a recess provided longitudinally therein behind the inner edge of the stop and with the inner wall stepped; of a resilient weather strip element having a portion seated in the innermost and reduced stepped portion of the recess and adapted to contact with the corresponding stop member to be held thereby within the recess, and having a portion projecting beyond the recess to contact with the stile of the sash.

8. The combination with a window of the double-hung type and embodying a frame, sashes and stop members, the frame having a recess provided longitudinally therein behind the inner edge of the stop and with the inner wall stepped; of a resilient and angular weather strip element having a portion seated in the innermost and reduced stepped portion of the recess and adapted to contact with the corresponding stop member to be held thereby within the recess, and having a portion projecting beyond the recess to contact with the stile of the sash.

9. The combination with a window of the double-hung type and embodying a frame, sashes and stop members, the frame having a recess provided longitudinally therein behind the inner edge of the stop and with the inner wall stepped; of a resilient weather strip element having a portion seated in the innermost and reduced stepped portion of the recess and adapted to contact with the corresponding stop member to be held thereby within the recess, and having a portion projecting beyond the recess to contact with the stile of the sash, and the recess being provided at its outer end with a shoulder to engage the projecting portion for limiting its movement in a direction toward the stile of the window.

ULRICH A. ABRAHAMS.